(12) United States Patent
Smith et al.

(10) Patent No.: US 10,645,139 B2
(45) Date of Patent: May 5, 2020

(54) NETWORK PROTOCOL FOR SWITCHING BETWEEN PLAIN TEXT AND COMPRESSED MODES

(71) Applicant: Microsoft Technology Licensing, LLC, Redmond, WA (US)

(72) Inventors: Gregory M. Smith, Seattle, WA (US); Molly Rose Suver, Seattle, WA (US); Connor Peet, Redmond, WA (US); Gershom L. Payzer, Redmond, WA (US); Richard Michael Fox, Berlin (DE)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/628,327

(22) Filed: Jun. 20, 2017

(65) Prior Publication Data
US 2018/0295069 A1 Oct. 11, 2018

Related U.S. Application Data

(60) Provisional application No. 62/482,537, filed on Apr. 6, 2017.

(51) Int. Cl.
*H04L 29/06* (2006.01)
*A63F 13/86* (2014.01)
(Continued)

(52) U.S. Cl.
CPC .......... *H04L 65/608* (2013.01); *A63F 13/335* (2014.09); *A63F 13/497* (2014.09); *A63F 13/86* (2014.09); *G06F 13/38* (2013.01); *H04L 65/4069* (2013.01); *H04L 65/4092* (2013.01); *H04L 65/601* (2013.01); *H04L 69/04* (2013.01); *A63F 13/87* (2014.09);
(Continued)

(58) Field of Classification Search
CPC ............... H04L 69/04; H04L 29/06027; H04L 29/0604; H03M 7/3086; H03M 7/30
See application file for complete search history.

(56) References Cited

U.S. PATENT DOCUMENTS 8,661,496 B2 2/2014 Perlman et al.
9,853,660 B1* 12/2017 Gopal ..................... H03M 7/40
(Continued)

OTHER PUBLICATIONS

Michaels, Chris, "Latency Matters in Online Gaming", https://www.wowza.com/blog/latency-matters-in-online-gaming, Published on: Mar. 7, 2017, 5 pages.
(Continued)

*Primary Examiner* — Raj Jain
(74) *Attorney, Agent, or Firm* — Ray Quinney & Nebeker P.C.; John O. Carpenter

(57) ABSTRACT

Technologies are described for enabling a network protocol that supports switching between communication modes, including a plain text mode and a compressed mode. Switching between the plain text mode and the compressed mode can be performed without closing a network connection between devices. The network protocol can support communication among the devices interacting with a live interactive video game streaming service. The network protocol can also communicate throttling and/or aggregation messages between the devices of the live interactive video game streaming service.

20 Claims, 7 Drawing Sheets

(51) Int. Cl.
   *H04N 5/268*     (2006.01)
   *G06F 13/38*     (2006.01)
   *A63F 13/335*    (2014.01)
   *A63F 13/497*    (2014.01)
   *A63F 13/87*     (2014.01)

(52) U.S. Cl.
   CPC ..... *A63F 2300/572* (2013.01); *H04L 29/0604* (2013.01); *H04N 5/268* (2013.01)

(56) References Cited

U.S. PATENT DOCUMENTS

| | | | |
|---|---|---|---|
| 2002/0152219 A1* | 10/2002 | Singh | H04L 69/04 |
| 2003/0038805 A1 | 2/2003 | Wong et al. | |
| 2003/0083049 A1* | 5/2003 | Matthews | H03M 7/3088 |
| | | | 455/414.1 |
| 2012/0115580 A1 | 5/2012 | Hornik et al. | |
| 2012/0331502 A1 | 12/2012 | Mcintire et al. | |
| 2014/0018165 A1 | 1/2014 | Kern et al. | |
| 2014/0274368 A1 | 9/2014 | Cotter | |
| 2015/0121437 A1 | 4/2015 | Tan | |
| 2015/0201242 A1 | 7/2015 | Belton | |
| 2015/0298007 A1 | 10/2015 | Agrawal et al. | |
| 2015/0298010 A1 | 10/2015 | Trombetta et al. | |
| 2017/0003784 A1 | 1/2017 | Garg et al. | |
| 2017/0034237 A1 | 2/2017 | Silver | |
| 2017/0072322 A1 | 3/2017 | Navok et al. | |
| 2018/0004383 A1* | 1/2018 | Iwami | G06F 3/0487 |
| 2018/0225537 A1 | 8/2018 | Cole et al. | |
| 2018/0295069 A1* | 10/2018 | Smith | H04L 49/10 |
| 2019/0281102 A1 | 9/2019 | Smith et al. | |

OTHER PUBLICATIONS

Johnson, Eric, "Watch This (and Play Along): Interactive Streaming Puts the Power in Viewers' Hands", https://www.recode.net/2014/5/5/11626464/watch-this-and-play-along-interactive-streaming-puts-the-power-in, Published on: May 5, 2014, 3 pages.

Zhang, et al., "On Crowdsourced Interactive Live Streaming: A Twitch.TV-Based Measurement Study", In Proceedings of 25th ACM Workshop on Network and Operating Systems Support for Digital Audio and Video, Mar. 20, 2015, 7 pages.

"Genvid Releases Revolutionary Interactive Streaming Technology for eSports Broadcasts", http://www.fox34.com/story/34290347/genvid-releases-revolutionary-interactive-streaming-technology-for-esports-broadcasts, Jan. 18, 2017, 2 pages.

"About Twitch", Retrieved on: https://web.archive.org/web/20170605010255/https://www.twitch.tv/p/about, Retrieved Date: Jun. 5, 2017, 3 Pages.

"Blizzard Streaming", Retrieved From: https://us.battle.net/support/en/article/7783, Retrieved on: Jun. 5, 2017, 11 Pages.

"Get started with You Tube Gaming", Retrieved From: https://support.google.com/youtubegaming/answer/6213241?hl=en&ref_topic=6213253, Retrieved on: Jun. 5, 2017, 2 Pages.

"The Rough and Dirty Guide to Getting Started on StreamMe!", Retrieved From: https://www.stream.me/pp./getting-started, Retrieved on: Jun. 5, 2017, 5 Pages.

"Non Final Office Action Issued in U.S. Appl. No. 15/628,512", dated Jun. 1, 2018, 14 Pages.

C., Dave, "Twitch MultiStreaming", Retrieved From: https://twitchfan.wordpress.com/, Nov. 3, 2014, 3 Pages.

PR Newswire, "Genvid Releases Revolutionary Interactive Streaming Technology for eSports Broadcasts," <http://www.prnewswire.com/news-releases/genvid-releases-revolutionary-interactive-streaming-technology-for-esports-broadcasts-300391171.html> 4 pages (Jan. 18, 2017).

"Choice Chamber—Gameplay Walkthrough Part 1—Live on Twitch with Facecam! (PC)", Retrieved From: https://www.youtube.com/watch?v=khXvnr7yDrk, Retrieved Date: Jun. 22, 2014, 5 Pages.

"How to: Interactive Minecraft Stream on Beam.pro", Retrieved From: https://www.youtube.com/watch?v=2_9HPs5dJ7w , Retrieved Date: Jan. 18, 2016, 1 Page.

"Non Final Office Action Issued in U.S. Appl. No. 15/655,558", dated Nov. 16, 2018, 11 Pages.

"Non-Final Office Action Issued in U.S. Appl. No. 15/628,512", dated Jul. 3, 2019, 12 Pages.

* cited by examiner

NETWORK PROTOCOL FOR SWITCHING BETWEEN PLAIN TEXT AND COMPRESSED MODES

CROSS REFERENCE TO RELATED APPLICATIONS

This application claims the benefit of U.S. Provisional Application No. 62/482,537, filed Apr. 6, 2017, which is hereby incorporated by reference.

BACKGROUND

Video game streaming services provide live video game streaming to viewers via the Internet. Video game streaming services use networks, such as the Internet, to communicate information between the service, viewers, and broadcasters. While some network protocols can provide reliable communications, they may not provide the flexibility or performance to meet the needs of a video game streaming service. For example, such network protocols may not support different modes of communication or other features that could increase the performance of the video game streaming service.

Therefore, there exists ample opportunity for improvement in technologies related to network protocols for network communications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for enabling network communications using a network protocol that supports switching between different communication modes. For example, the network connection supports switching between a plain text mode and a compressed mode. The switching can be performed without closing the network connection.

For example, a network connection can be established between a computing device and a second computing device. Network packets can be exchanged over the network connection using a plain text mode. A network packet can be received from the second computing device requesting a switch of the network connection from the plain text mode to a compressed mode. A network packet can be sent to the second computing device accepting the switch to the compressed mode. After the switch to the compressed mode, network packets can be exchanged using the compressed mode with the second computing device over the network connection. The network connection can remain open during the operations and does not close when switching between the plain text mode and the compressed mode.

As another example, two computing devices that are communicating using a compressed mode can fall back from the compressed mode to the plain text mode. For example, one of the computing devices can detect a fall back condition and request that the other computing device switch to the plain text mode. The network connection can remain open during the operations and does not close when switching between the compressed mode and the plain text mode.

As another example, the network protocol can be used to send network packets containing various throttling and/or aggregation messages. For example, throttling rules can be used to throttle live interactive control messages received from viewer devices. Cooldowns can be used to disable live interactive controls for a period of time. Sampling rates can be used to limit the frequency of analog interactive control messages.

As described herein, a variety of other features and elements can be incorporated into the technologies separately and/or in combination.

DETAILED DESCRIPTION

Overview

Figure 1:
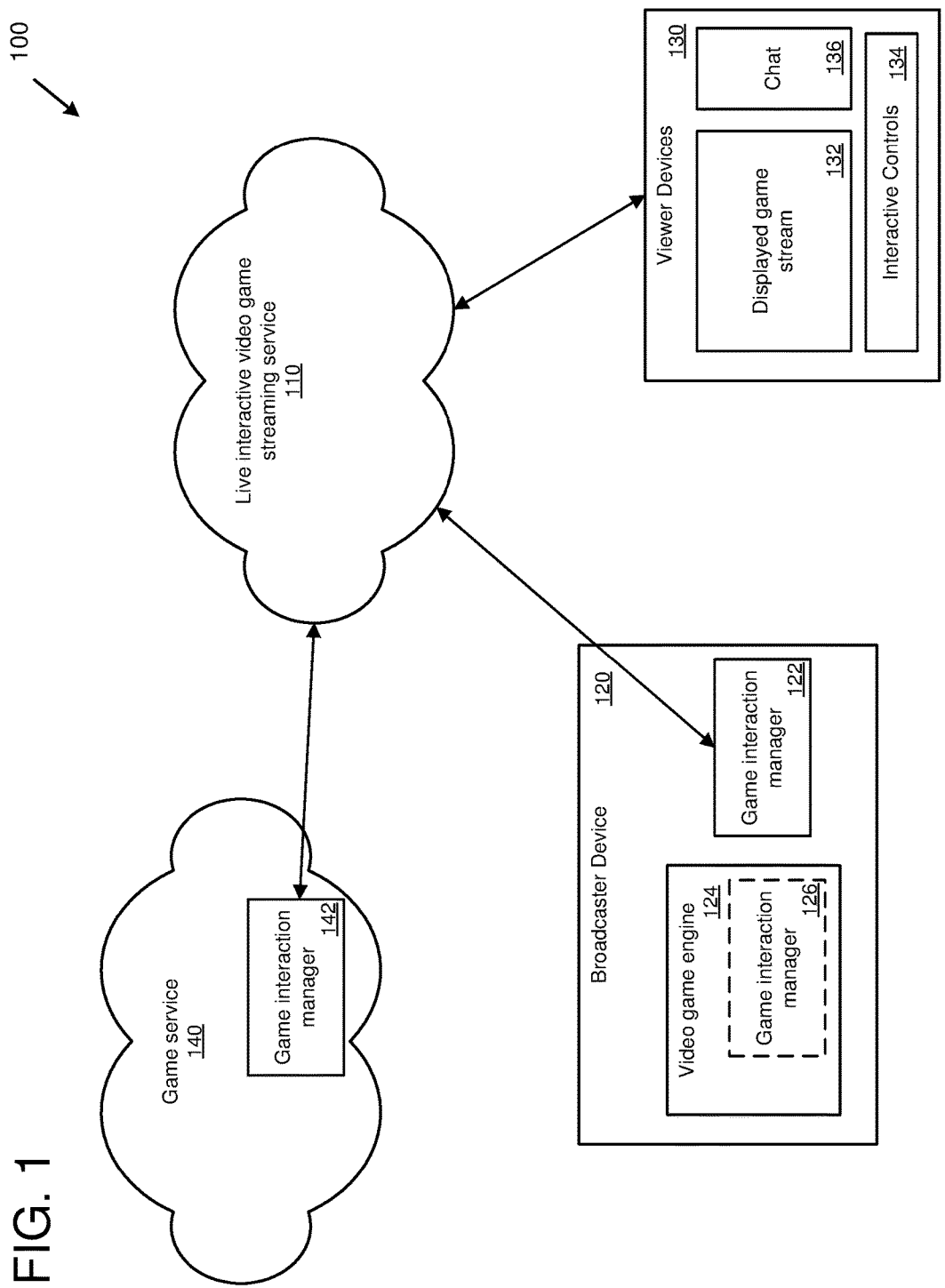
FIG. 1 is diagram depicting an example live video game streaming environment.

As described herein, various technologies are described for enabling interactivity with video games by viewers of a live video game streaming service. The live video game streaming service is a service in which a broadcaster plays a video game (e.g., on the broadcasters computing device) which is then streamed live to a number of viewers (e.g., tens, hundreds, thousands, or more). The live video game can be streamed by a streaming service (e.g., a cloud-based streaming service operating as a web site). The viewers of the live video game stream can interact with the video game, and control aspects of gameplay, in a variety of ways. For example, the viewers can drop items in the game (e.g., weapons, armor, power-ups, etc.), control choices (e.g., tell the broadcaster which direction to go, or which action to take, in the game), take control of the broadcaster's avatar and/or other game characters, etc. One example of a live video game streaming service is the Mixer interactive livestreaming service provided by Microsoft® (previously the Beam service).

In order to support the live interactivity, the live video game streaming service operates with very low latency (e.g., sub-second latency, such as much lower than one second). Operating with very low latency allows the viewers to interact in real-time with the video game as the broadcaster is playing, and have their interactions occur in synchronization with the gameplay. For example, if the broadcaster is playing a game in which their avatar has a choice of taking paths to the left or the right, then a viewer could activate a command to direct the broadcaster to take one of the paths in real-time. Operating with very low latency makes the interaction effective and enhances the interaction experience of the viewers (e.g., with higher latency if the broadcaster had already taken one of the paths then the viewer's interaction would not work). Sub-second latency allows the broadcaster to communicate in real-time, and the viewers to respond in real-time. Operating with Sub-second latency also provides very close synchronization (e.g., less than one-second difference) between multiple broadcaster streams in a co-streaming situation. For example, if two broadcasters are co-streaming the same video game in the same multiplayer session, viewers will observe the two broadcaster's streams as very closely synchronized which will result in a more seamless experience (e.g., instead of having broadcaster streams that are not closely synchronized, such as with greater than one second difference, which can result in a confusing experience for the viewers).

Various types of interactivity can be provided within the live video game streaming service environment. For example, the viewers can be provided with interactive controls (e.g., buttons, joysticks, gamepad controls, or other interactive controls) that can be activated to affect the video game, such as spawning enemies in the video game, dropping power-ups, creating in-game items (e.g., weapons, armor, etc.), increasing player health, taking control of the broadcaster's player in the game, and taking control of another character in the game. Examples of interactive controls include buttons that the viewers can press and joysticks or directional controls that the user can move in various directions.

Live Video Game Streaming Environment

In the technologies described herein, an environment can be provided to support live video game streaming. For example, various computing devices and computing services can provide a live interactive video game streaming service web site that communicates with broadcasters to receive interactive video game streams and communicates with viewers to provide the interactive video game streams.

FIG. 1 is a diagram 100 depicting an example live video game streaming environment. In the diagram 100, a live interactive video game streaming service 110 provides live interactive video game streaming allowing viewers using viewer devices 130 to view and interact with video games being played by broadcasters using broadcaster devices 120. The live interactive video game streaming service 110 can include various types of computer hardware and software (e.g., servers, web hosting software, streaming software, web server software, cloud computing resources, etc.). In some implementations, the live interactive video game streaming service 110 operates as a web site where the viewers can browse various live video game streams, view a selected live video game stream, and interact in real-time with the video game being played.

In the diagram 100, a broadcaster device 120 is used by a broadcaster to live stream a video game. The broadcaster device 120 can be a desktop computer, laptop computer, or another type of computing device.

Using the broadcaster device 120, the broadcaster plays the video game and streams it live to the viewer devices 130 via the live interactive video game streaming service 110. In some implementations, the video game is running locally on the broadcaster device 120, as indicated by the video game engine 124. In some implementations, running the video game involves communication by the broadcaster device 120 with an external or remote video game service 140 (e.g., when playing an online and/or multiplayer video game).

A game interaction manager (e.g., game interaction manager 122, 126, and/or 142) manages interaction with the video game. For example, the game interaction manager can maintain the control state of the various interactive controls (e.g., received as control events from the viewer devices 130 via the live interactive video game streaming service 110), communicate using a network protocol that communicates control events and that supports switching communication modes, and/or supports co-streaming among a number of broadcasters. The game interaction manager 122 can run on the broadcaster device 120 (e.g., as part of a software component or software development kit that is associated with the live interactive video game streaming service 110). The game interaction manager 126 can also run as a part of the video game engine 124. The game interaction manager 142 can also run as part of the game service 140. In some implementations, only one or more instances of the game interaction manager are present (e.g., just game interaction manager 122). In some implementations, the interaction manager is called the Mixer manager.

Network Protocol

In the technologies described herein, a network communication protocol is provided to enable interactivity with video games by viewers of a live video game streaming service. For example, the network protocol can support a number of communication modes including a plain text communication mode and one or more compressed data communication modes. The network protocol can support switching between the communication modes in real-time. For example, a server and client that are communicating using the protocol can switch between using a plain text (uncompressed text) mode and a compressed data mode based on various events (e.g., due to a latency spike or communication errors). In some implementations, the compressed mode supports multiple compression algorithms.

The network protocol can be used for communication between a server device and a client device over a network (e.g., over the Internet). For example, the protocol can be used for network communication between the viewer devices 130 and the live interactive video game streaming service 110, and between the live interactive video game service 110 and the broadcaster device 120. The protocol can be used for network communication between the live interactive video game streaming service 110 and the game service 140. However, the network protocol is not limited to use within a video game streaming service environment, and the network protocol can be used in any type of networking environment in which computing devices communicate via a data communication network.

In some implementations, the server and client that are communicating using the protocol agree to switch communication modes. For example, if the server and client are communicating using a plain text mode and the client wants to upgrade to a compressed mode, then the client sends a message to the server requesting the upgrade. If the server agrees, the server sends a message back to the client (using the plain text mode) indicating that the server will switch to the compressed mode. For example, the server sends the message back to the client using the plain text mode so that the client is certain that the server received the upgrade request and is now ready to receive and process messages using the compressed mode. Next, the client sends data to the server, and the server sends data to the client, using the compressed mode. Later, if the server wants to switch back to the plain text mode (e.g., due to communication errors), then the server sends a message to the client to set the compressed mode to plain text. Once the server receives a message from the client (using the compressed mode) indicating that the client will now use the plain text mode, the server can start sending data using the plain text mode.

In some implementations, the network protocol sends its payload data using the WebSockets protocol. For example, the network protocol uses a WebSockets protocol header variable to indicate whether the payload data is plain text (using textual WebSockets data frames) or binary (using binary WebSockets data frames). In some implementations, the network protocol sends its data using JavaScript Object Notation (JSON) packets (also called JSON messages) carried within the WebSockets data frames (e.g., with each WebSockets data frame containing one JSON packet).

In some implementations, an indicator (e.g., a data frame header variable) in each network packet communicated using the network protocol indicates whether the network packet contains data in the plain text mode (plain text data) or data in a compressed mode (data that has been compressed according to a compression algorithm). For example, if the indicator is set to a first value, then a plain text mode network packet is indicated, and if the indicator is set to a second value, then a compressed mode network packet is indicated. In an implementation using the WebSockets protocol, the data frame header variable is the opcode variable, which can be set to a first value denoting a text frame (used to indicate a plain text network packet) and a second value denoting a binary frame (used to indicate a compressed data network packet).

Network packets that are communicated using the plain text mode encapsulate their payload data as plain text (plain text that is not compressed, such as in an ASCII or Unicode format). Network packets that are communicated using the compressed mode encapsulate their payload data in a binary compressed format (e.g., using a compression algorithm, such as gzip or lz4).

In a specific implementation, there are two types of JSON packets, a method packet and a reply packet. Packet fields which are unused in a given context can be set to null or omitted. Timestamps are millisecond precision UTC timestamps. The following is an example JSON method type packet.

```
{
    "type": "method",
    "id": 123,
    "discard": false,
    "method": "divide",
    "params": {
        "numerator": 16,
        "denominator": 4
    }
}
```

In the specific implementation of JSON packets that are of type method, "method" is the name of the method to call. The parameters (params) is an object of named arguments to pass to the method (in this example, the method is a divide operation). The id is a 32-bit unsigned integer. The id is included in the reply packet and used to correlate replies from the socket. If discard is set to true, then the live interactive video game streaming service does not require a replay for the method call.

In the specific implementation of JSON packets, reply packets are sent in response to method packets. For example, reply packets are sent in response to method packets unless the socket closes before the replies can be sent. The following are two example reply packets (one successful reply packet and one error reply packet).

```
{
    "type": "reply",
    "result": 4,
    "error": null,
    "id": 123
}
{
    "type": "reply",
    "result": null,
    "error": {
        "code": 4000,
        "message": "Cannot divide by zero.",
        "path" : "denominator"
    },
    "id": 124
}
```

In the specific implementation of JSON reply packets, the type is set to "reply." The id is set to the id passed in the corresponding method packet, except for error packets (e.g., the packet cannot be parsed), in which case the id is set to zero. The result contains the result of the method, or null if an error occurred. For an error reply packet, the error field contains a JSON error object.

In the specific implementation, the compressed mode can be set to use one of a number of different compression algorithms. For example, the compression algorithm can be set to "none" indicating the use of the plain text mode (with the data frame header variable set to use plain text frames), "gzip" indicating the use of the gzip compression algorithm (with the data frame header variable set to use binary frames), or "lz4" indicating the use of the lz4 compression algorithm (with the data frame header variable set to use binary frames).

In the specific implementation, the gzip compressed mode operates as follows. Network packets are sent in binary WebSocket data frames and are prefixed with the uncompressed data's length as an unsigned variable-length integer. In pseudo-code:

message=encode_varint(len(packet))+deflate(packet)

The client and server reuse the same gzip data stream to send messages, flushing writers to end each frame (e.g., using Z_SYNC_FLUSH, if using zlib). Likewise, the readers in both the client and server should treat incoming messages as sequential parts of the same data stream.

In the specific implementation, the lz4 compressed mode operates as follows. The lz4 compression algorithm may be chosen as an alternative to gzip, providing significantly faster compression and decompression than zlib at the cost of a poorer compression ratio. Implementation is similar to gzip. Network packets are sent in binary WebSocket data frames and are prefixed with the uncompressed data's length as an unsigned variable-length integer. The client and server reuse the same lz4 data stream to send messages, flushing writers to end each frame. Likewise the readers in both the client and server should treat incoming messages as sequential parts of the same data stream.

In the specific implementation, a setCompression message is used to request the compressed mode and indicate the available compression algorithms. The setCompression message changes the compression algorithm used to encode messages. The response to the setCompression message from the computing device receiving the message is a network packet that uses the plain text mode and that indicates the compressed mode is accepted along with the compression algorithm to be used. After accepting the compressed mode, following network packets use the compressed mode. If a call to setCompression results in the current compression scheme being chosen, the computing device resets any state associated with the current scheme. An example setCompression request message is depicted below (the "scheme" argument is set to a list of compression algorithms in order of preference, from most preferred to least preferred).

```
{
    "type": "method",
    "id": 123,
    "method": "setCompression",
    "params": {
        "scheme": ["lz4", "gzip"]
    }
}
```

An example reply to the above request is depicted below (this is a successful replay in which the compression algorithm is chosen to be gzip).

```
{
    "type": "reply",
    "result": {
        "scheme": "gzip"
    },
    "error": null,
    "id": 123
}
```

Switching Communication Modes

In the technologies described herein, the protocol can support switching between the communication modes in real-time. For example, two computing devices that are communicating using the network protocol can switch between a using plain text mode and a compressed mode. The two computing devices can be server or client computing devices (e.g., the network protocol can be used between two servers, two clients, or a client and server). In some implementations, the compressed mode uses one of a number of compression algorithms (e.g., the switching procedure can identify which of a plurality of compression algorithms will be used when communicating using the compressed mode). The two computing devices can also switch back from a compressed mode to a plain text mode.

Figure 2:
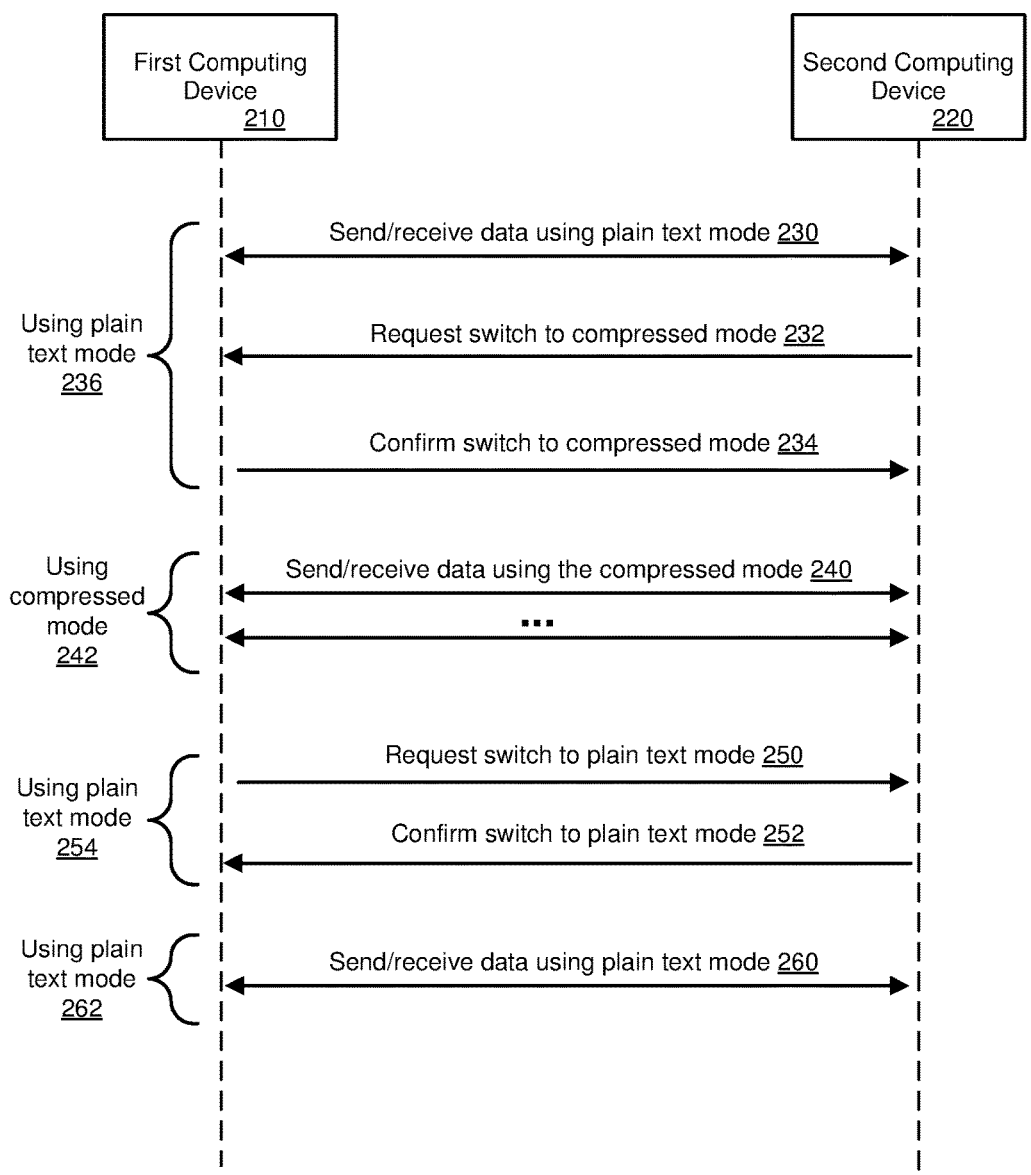
FIG. 2 is diagram depicting an example network communication flow that includes switching between plain text and compressed communication modes.

FIG. 2 is diagram 200 depicting an example network communication flow that includes switching between plain text and compressed communication modes. In the diagram 200, a network connection has been established between a first computing device 210 and a second computing device 220. For example, the first computing device 210 can be the live interactive video game streaming service 110 (e.g., one of the servers implementing the live interactive video game streaming service 110), and the second computing device 220 can be a viewer device (e.g., one of viewer devices 130) or a broadcaster device 120. The first computing device 210 could also be one of the viewer devices (e.g., one of viewer devices 130) or the broadcaster device 120, with the second computing device 220 being the live interactive video game streaming service 110.

In some implementations, the network protocol sends and receives data using network packets (e.g., containing JSON messages). In some implementations, the network packets are sent and received using the WebSockets protocol.

As depicted in the diagram 200, the first computing device 210 and second computing device 220 are sending and receiving data (e.g., network packets) using a plain text mode, as depicted at 230. As depicted at 232, the second computing device 220 sends a request to the first computing device 210 to switch from the plain text mode to a compressed mode. For example, the request can be a request network message that comprises information indicating that the second computing device 220 is requesting the switch and an indication of the compression algorithm being requested (e.g., a single compression algorithm or a list of compression algorithms, which can be in order of preference). As depicted at 234, the first computing device 210 sends a confirmation of the switch to the compressed mode to the second computing device 234 (e.g., sends a network message indicating that the first computing device 210 will switch to the compressed mode and that subsequent network messages will be communicated using the compressed mode). As depicted at 236, the network communications depicted at 230, 232, and 234 use the plain text mode.

A switch from plain text mode to compressed mode can be initiated based on bandwidth availability. For example, a computing device could initiate a switch in order to more efficiently utilize available bandwidth (e.g., the device's network connection may be congested and a switch to compressed mode could reduce the congestion). As another example, the live interactive video game streaming service 110 could request that viewers switch to compressed mode to reduce bandwidth utilization. In some implementations, the live interactive video game streaming service 110 requests the switch based on the number of viewer devices. For example, if the number of viewer devices connected to the live interactive video game streaming service 110 increases above a threshold value, then the live interactive video game streaming service 110 could request that the viewer devices switch to compressed mode (e.g., the compressed mode can allow more viewer devices to be supported due to the decreased bandwidth required for each viewer device).

After the switch has been made to the compressed mode, the first computing device 210 and the second computing device 220 send and receive data using the compressed mode, as depicted at 240. As depicted at 242, the network communications depicted at 240 use the compressed mode.

Following the network communications depicted at 240, the first computing device 210 sends a request to the second computing device 220 to switch from the compressed mode to the plain text mode, as depicted at 250. There can be a number of reasons that the first computing device 210 requests the switch to the plain text mode. For example, the first computing device 210 may have received corrupted or invalid data (e.g., due to a compression algorithm issue, a network problem, etc.) and therefore needs to switch back to the plain text mode. As another example, the first computing device 210 could be experiencing high processing unit (e.g., CPU) load (e.g., load above a threshold value) and therefore request a switch back to the plain text mode to reduce processing unit load. As depicted at 252, the second computing device 220 sends a confirmation of the switch to the plain text mode to the first computing device 210.

As depicted at 254, the network communications depicted at 250 and 252 use the plain text mode. In some implementations, both the first computing device 210 and the second computing device 220 can request to fall back to plain text mode at any time by sending a network packet using the plain text mode. Allowing either side to fall back to plain text mode at any time provides improvements in reliability of the network protocol. For example, if one computing device is experiencing an error sending and/or receiving compressed data, then the one computing device may not be able to communicate to the other computing device to switch modes using the compressed mode (e.g., the request may be communicated using corrupted compressed data which the other computing device could not decode and thus not recognize a request to switch modes). However, if both computing devices can request to fall back to plain text mode at any time by sending a plain text mode network packet, then switching back to the plain text mode is more reliable with less chance of data corruption or data loss. In some implementations, any network packet sent using the plain text mode (e.g., not just network packet specifically requesting a switch) when the network connection is currently using the compressed mode will result will be interpreted as a request to switch to the plain text mode After the switch to plain text mode, the first computing device 210 and the second computing device 220 send and receive data using the plain text mode, as depicted at 260. As depicted at 262, the network communications depicted at 260 use the plain text mode.

The network communications depicted in FIG. 2 (as depicted at 230, 232, 234, 240, 250, 252, and 260) occur during a network connection between the first computing device 210 and the second computing device 220 (e.g., a network connection established over the Internet and/or other local area or wide area networks). The network connection remains open during the network communications (i.e., the network connection does not close in order to switch between the plain text mode and the compressed mode). Because the network connection is not closed, the computing devices can continue communicating using the same network connection and the same session without having to close and establish a new connection and session.

The network protocol also provides flexibility in supporting different types of computing devices. For example, a live interactive video game streaming service 110 can communicate efficiently with a variety of viewer devices, some using a compressed mode (e.g., those devices with available bandwidth and processing capability) and some using a plain text mode (e.g., as a default for viewer devices with limited bandwidth, processing power, and/or that do not support the compressed mode).

Figure 3:
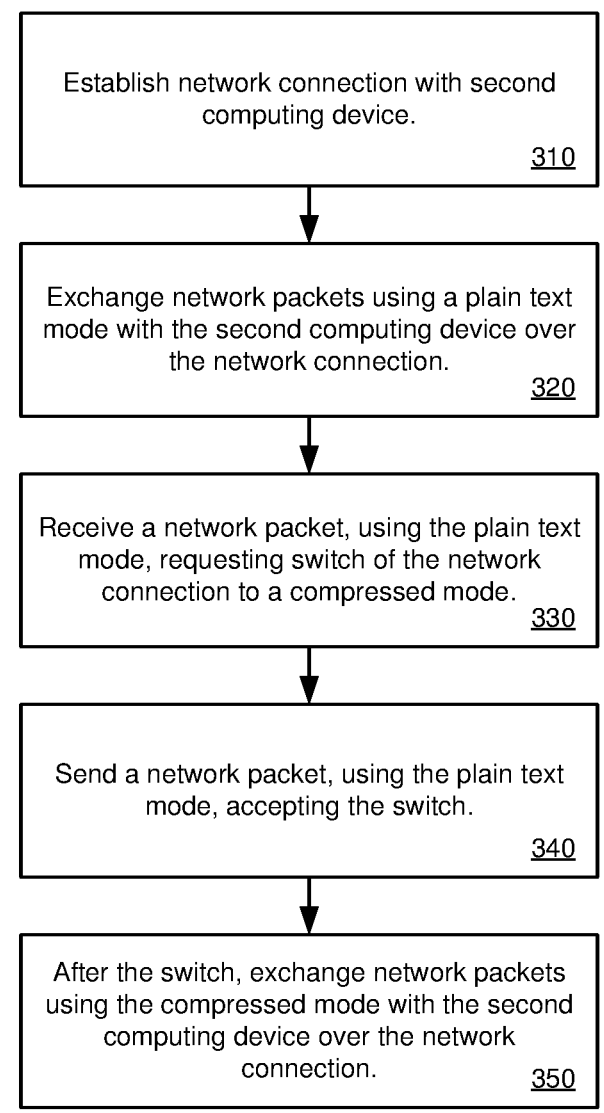
FIG. 3 is a flowchart of an example method for performing network protocol operations for network communication, including switching communication modes.

FIG. 3 is a flowchart of an example method 300 for performing network protocol operations for network communication, including switching communication modes. For example, the example method 300 can be used in implementing a network protocol for network communications between the broadcaster device 120 and the live interactive video game streaming service 110, and/or between the viewer devices 130 and the live interactive video game streaming service 110. The example method 300 can be performed by the broadcaster device 120, one or more of the viewer devices 130, and/or the live interactive video game streaming service 110.

At 310, a network connection is established with a second computing device (e.g., via the Internet). In some implementations, the network connection uses the WebSockets network protocol to send and receive network packets. The network connection uses a plain text mode for data sent to, and received from, the second computing device. For example, the network connection can be setup with the second computing device and set to initially use the plain text mode, or the network connection can be currently using the plain text mode.

At 320, network packets are exchanged using the plain text mode with the second computing device over the network connection. Use of the plain text mode can be indicated, for example, by a data frame header variable with a first value.

At 330, a network packet is received (using the plain text mode) from the second computing device over the network connection requesting a switch of the network connection to a compressed mode. For example, the request can list a one or more available compression algorithms in order of preference.

At 340, a network packet is sent (in the plain text mode) to the second computing device accepting the switch of the network connection from the plain text mode to the compressed mode. For example, the reply network packet can indicate which one of the available compression algorithms will be used for the compressed mode.

At 350, after the switch to the compressed mode, network packets are exchanged using the compressed mode with the second computing device over the network connection. Use of the compressed mode can be indicated, for example, by the data frame header variable with a second value.

In the example method 300, the network connection is a persistent network connection over which the network packets are exchanged. In addition, the network connection supports communicating messages and switching communication modes (e.g., between the plain text mode and the compressed mode, and back again) while the network connection remains open, and without having to close the network connection and establish a new network connection.

Figure 4:
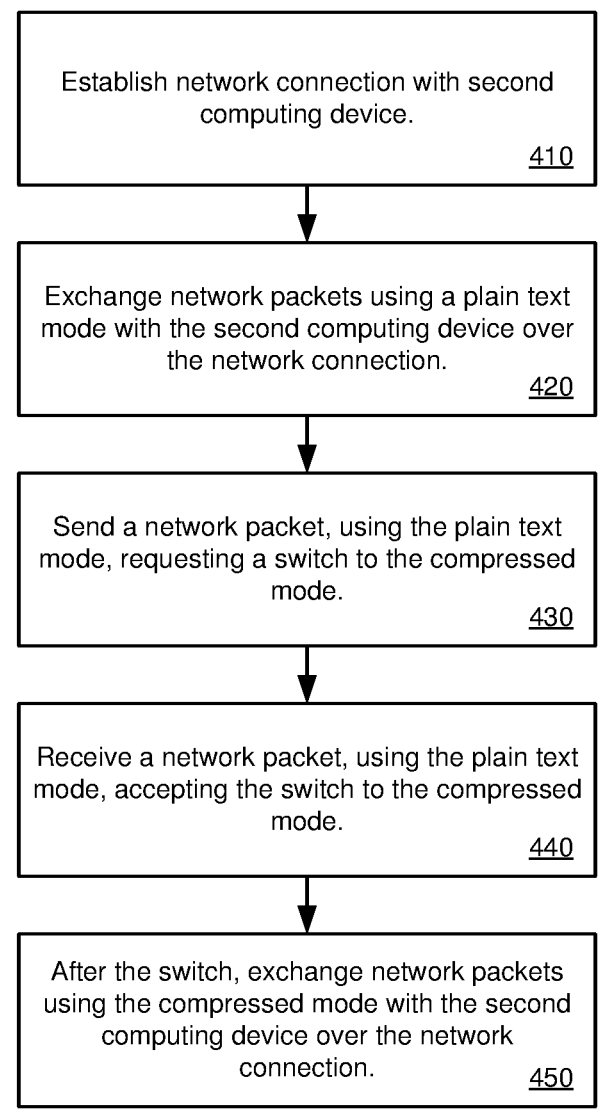
FIG. 4 is a flowchart of an example method for performing network protocol operations for network communication, including switching communication modes.

FIG. 4 is a flowchart of an example method 400 for performing network protocol operations for network communication, including switching communication modes. For example, the example method 400 can be used in implementing a network protocol for network communications between the broadcaster device 120 and the live interactive video game streaming service 110, and/or between the viewer devices 130 and the live interactive video game streaming service 110. The example method 400 can be performed by the broadcaster device 120, one or more of the viewer devices 130, and/or the live interactive video game streaming service 110.

At 410, a network connection is established with a second computing device (e.g., via the Internet). In some implementations, the network connection uses the WebSockets network protocol to send and receive network packets. The network connection uses a plain text mode for data sent to, and received from, the second computing device. For example, the network connection can be setup with the second computing device and set to initially use the plain text mode, or the network connection can be currently using the plain text mode.

At 420, network packets are exchanged using the plain text mode with the second computing device over the network connection. Use of the plain text mode can be indicated, for example, by a data frame header variable with a first value.

At 430, a network packet is sent (in the plain text mode) to the second computing device over the network connection requesting a switch of the network connection from the plain text mode to a compressed mode. For example, the request can list a one or more available compression algorithms in order of preference.

At 440, a network packet is received (in the plain text mode) from the second computing device accepting the switch of the network connection from the plain text mode to the compressed mode. For example, the received network packet can indicate which one of the available compression algorithms will be used for the compressed mode.

At 450, after the switch to the compressed mode, network packets are exchanged using the compressed mode with the second computing device over the network connection. Use of the compressed mode can be indicated, for example, by the data frame header variable with a second value.

In the example method 400, the network connection is a persistent network connection over which the network packets are exchanged. In addition, the network connection supports communicating messages and switching communication modes (e.g., between the plain text mode and the compressed mode, and back again) while the network connection remains open, and without having to close the network connection and establish a new network connection.

Figure 5:
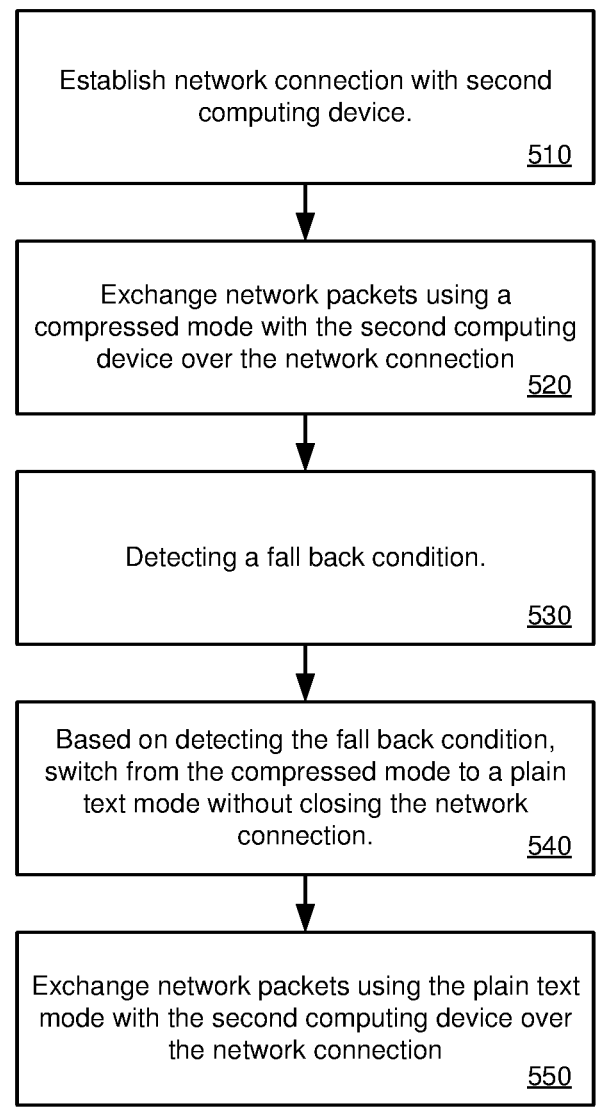
FIG. 5 is a flowchart of an example method for performing network protocol operations for network communication, including falling back to a plain text mode.

FIG. 5 is a flowchart of an example method 500 for performing network protocol operations for network communication, including falling back to a plain text mode. For example, the example method 500 can be used in implementing a network protocol for network communications between the broadcaster device 120 and the live interactive video game streaming service 110, and/or between the viewer devices 130 and the live interactive video game streaming service 110. The example method 500 can be performed by the broadcaster device 120, one or more of the viewer devices 130, and/or the live interactive video game streaming service 110.

At 510, a network connection is established between the computing device performing the method and a second computing device. In some implementations, the network connection uses the WebSockets network protocol to send and receive network packets.

At 520, network packets are exchanged between the computing devices using a compressed mode over the network connection.

At 530, the computing device detects a fall back condition. The fall back condition can be detected based on various types of errors (e.g., invalid compressed data that the computing device cannot decompress, errors in implementation of the compression algorithm used for the compression, network errors, etc.) and/or other conditions (e.g., processing load of the computing device increasing above a threshold value).

At 540, based on the detected fall back condition, the network connection is switched from the compressed mode to the plain text mode. For example, the computing device can send a request (e.g., in the plain text mode) to the second computing device requesting the switch to the plain text mode, and the second computing device can send a reply (e.g., in the plain text mode) agreeing to the switch to the plain text mode.

At 550, after the network connection has been switched to the plain text mode, network packets are exchanged with the second computing device over the network connection using the plain text mode.

In the example method 500, the network connection is a persistent network connection over which the network packets are exchanged. In addition, the network connection supports communicating messages and switching communication modes (e.g., between the plain text mode and the compressed mode, and back again) while the network connection remains open, and without having to close the network connection and establish a new network connection.

Aggregation and Throttling

In the technologies described herein, aggregation and/or throttling can be performed to manage interactive control events. In some implementations, aggregation and/or throttling is performed at the live interactive video game streaming service 110 for interactive control events received from viewer devices 130 using the network protocol. Aggregation and/or throttling can also be performed by the viewer devices (e.g., viewer devices 130) and/or broadcaster devices (e.g., broadcaster device 120).

In some implementations, throttling of interactive control events is performed. For example, the throttling can be performed by the live interactive video game streaming service 110 and/or by the game interaction manager. For example, throttling can be used to limit the number of interactive control messages that are passed along to the broadcaster device from the live interactive video game streaming service 110. For example, a maximum number of interactive control events may be passed along (e.g., at most one button press of a given button every second). For example, the first interactive control event of a given control received by the viewer devices can be passed through to the broadcaster device for each time period (e.g., each second or other time period), with the remaining interactive control events being discarded. Throttling of interactive control events can protect the broadcaster device from too much incoming data (e.g., which can cause performance issues or crashes). In addition, the broadcaster devices can be protected from too many viewers activating controls and/or repeatedly pressing the same control many times in a short period of time.

In some implementations, throttling of interactive control events is performed by the live interactive video game streaming service 110 based on messages in network packets received from the broadcaster device 120. For example, the broadcaster device 120 can send a message in a network packet containing a throttling rule using the network protocol instructing the live interactive video game streaming service 110 to perform throttling of interactive control messages received by the live interactive video game streaming service 110 from the viewer devices 130. For example, the broadcaster device 120 could instruct the live interactive video game streaming service 110, using a throttling rule, to pass through at most one interactive control message of a specific type (e.g., a press of button 1) per second. Using this technology, interactive control messages from multiple viewer devices (e.g., viewer devices 130) whose viewers are activating the specific interactive control (e.g., pressing button 1) can be throttled at the live interactive video game streaming service 110 so that at most one interactive control message is passed along to the broadcaster device 120 per time period.

In some implementations, the broadcaster device 120 controls throttling by sending a bandwidth throttling message, which is another type of throttling rule, to the live interactive video game streaming service 110 using the network protocol. The bandwidth throttling message instructs the live interactive video game streaming service 110 to limit the number of interactive control input messages passed through from the viewer devices based on a bandwidth limit. For example, bandwidth can be limited by a threshold bandwidth for an amount of time (e.g., a number of bytes per second). The incoming messages can be processed in order until the bandwidth threshold has been reached with subsequent messages being dropped until the next time period. In some implementations, the bandwidth limit is implemented using a leaky bucket algorithm.

In a specific implementation, the bandwidth throttling message is a setBandwidthThrottle method. This method is sent to the live interactive video game streaming service 110 to set throttling for certain control input messages which could become problematic in very high-traffic scenarios. It implements a leaky bucket algorithm; the broadcaster specifies the total bucket capacity in bytes and its drain rate in bytes per second. The parameters (labeled "params" below) contain a map of specific control input messages and their associated throttle rules. Throttling previously enabled on a specific control input message can be disabled by setting it to null. The following is an example setBandwidthThrottle message.

```
{
    "type": "method",
    "id": 123,
    "method": "setBandwidthThrottle",
    "discard": true,
    "params": {
        "giveInput": {
            "capacity": 10000000,
            "drainRate": 3000000
        },
        "onParticipantJoin": {
            "capacity": 0,
            "drainRate": 0
        },
        "onParticipantLeave": null
    }
}
```

In some implementations, a cooldown is used to throttle interactive control input. For example, a broadcaster (e.g., broadcaster device 120) can send a cooldown message via the network protocol to the live interactive video game streaming service 110. The cooldown message can specify a specific interactive control to be disabled and indicate a time in the future (a cooldown time) at which to re-enable the specific interactive control. The cooldown message can be delivered by the live interactive video game streaming service 110 to the viewer devices via the network protocol. For example, a specific interactive control button (e.g., displayed in the interactive controls 134) can be disabled across all of the viewers (e.g., all viewer devices 130) of the particular broadcaster sending the cooldown message. In some implementations, the cooldown time is specified as a timestamp (a specific time at which the interactive control input will be enabled). The cooldown time can also be specified as a relative time (e.g., disabled for the next 2 minutes). In some implementations, the cooldown message affects all viewer devices that are currently viewing the broadcaster's video game stream. In some implementations, the cooldown message can affect viewer devices on a case-by-case basis (e.g., specific individual viewer devices can be affected, groups of viewer devices, etc.).

In some implementations, throttling is implemented by controlling the sample rate of an interactive control (e.g., for analog controls such as joysticks and game controller analog sticks). Throttling of sampling rates can be performed by the live interactive video game streaming service 110 and/or by the viewer devices. In some implementations, sampling rate throttling is performed at the viewer device by limiting the number of control messages that are sent to the live interactive video game streaming service 110 for a period of time. For example, a viewer device with a joystick control can limit the number of joystick movement messages that are sent to the live interactive video game streaming service 110 to one message every 100 ms for a sampling rate of 100 ms (e.g., once every 100 ms the joystick position is sampled and sent to the live interactive video game streaming service 110). The live interactive video game streaming service 110 can send a message to the viewer devices to set the sampling rate for one or more identified interactive controls. In some implementations, sampling rate throttling is performed by the live interactive video game streaming service 110 by limiting the number of control messages that are passed along to the broadcaster device for a period of time. Sampling rate throttling performed by the live interactive video game streaming service 110 can be performed for individual viewer devices (e.g., limiting each viewer device to no more than one joystick movement message every 100 ms) or for groups of viewer devices together (e.g., limiting overall joystick movement messages to no more than one every 100 ms).

In some implementations, throttling is performed by adjust the cost for viewers to activate an interactive control. For example, setting the cost higher results in viewers activating the interactive control less frequently. With the Mixer video game streaming service, the cost is referred to as sparks, and activating an interactive control costs a number of sparks (e.g., for a viewer to activate a flame-thrower button the cost could be 100 sparks).

In some implementations, aggregation of interactive control events is performed. For example, the aggregation can be performed by the live interactive video game streaming service 110 and/or by the game interaction manager. Aggregation can be used to manage a large volume of interactive control events (e.g., many viewers that are all clicking on the same button). For example, aggregation can be used to combine a number of button click events (e.g., for a period of time) into a single control event that includes an indication of the number of times the button was clicked (e.g., an interactive control event indicating that button A was clicked 10 times in the last second for sending to the broadcaster device). Other types of interactive control events can be aggregated as well. For example, joystick or controller stick movements can be aggregated (e.g., a number of viewers can move the same joystick control and the events can be aggregated to average the movements to create a single joystick movement event for sending to the broadcaster device).

In some implementations, aggregation is controlled by the broadcaster or developer. For example, the broadcaster or developer can set aggregation instructions for various types of interactive control events. For example, a broadcaster or developer can set aggregation instructions on a per control basis (e.g., set a preference for aggregating a particular button on a time interval basis, such as aggregate all button clicks for the particular button every second and send the count).

Aggregation of interactive control events can protect the broadcaster device from too many incoming control events (e.g., which can cause performance issues or crashes). In addition, the broadcaster devices can be protected from too many viewers activating controls and/or repeatedly pressing the same control many times in a short period of time.

Computing Systems

Figure 6:
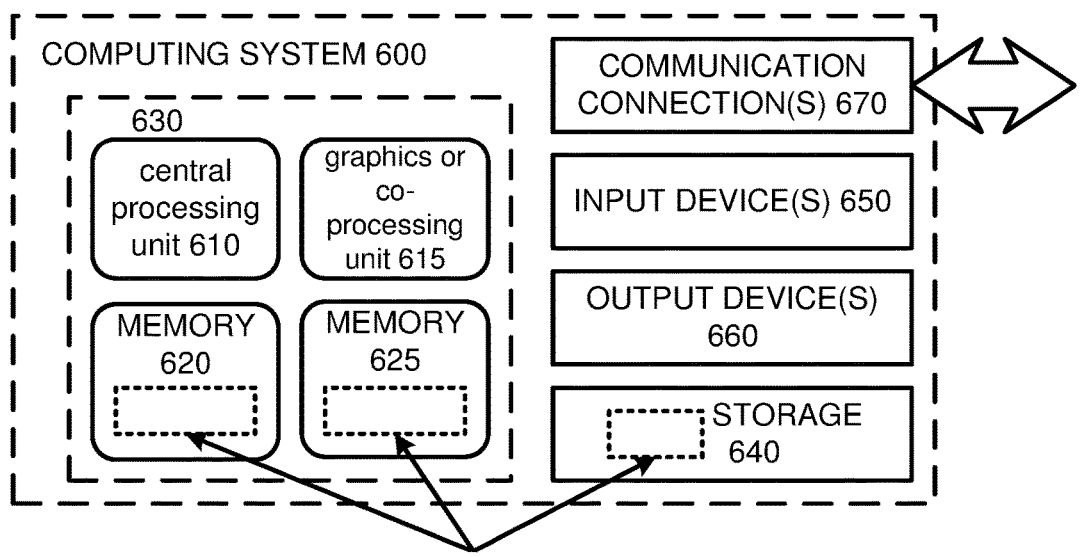
FIG. 6 is a diagram of an example computing system in which some described embodiments can be implemented.

FIG. 6 depicts a generalized example of a suitable computing system 600 in which the described technologies may be implemented. The computing system 600 is not intended to suggest any limitation as to scope of use or functionality, as the technologies may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more technologies described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more technologies described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 7:
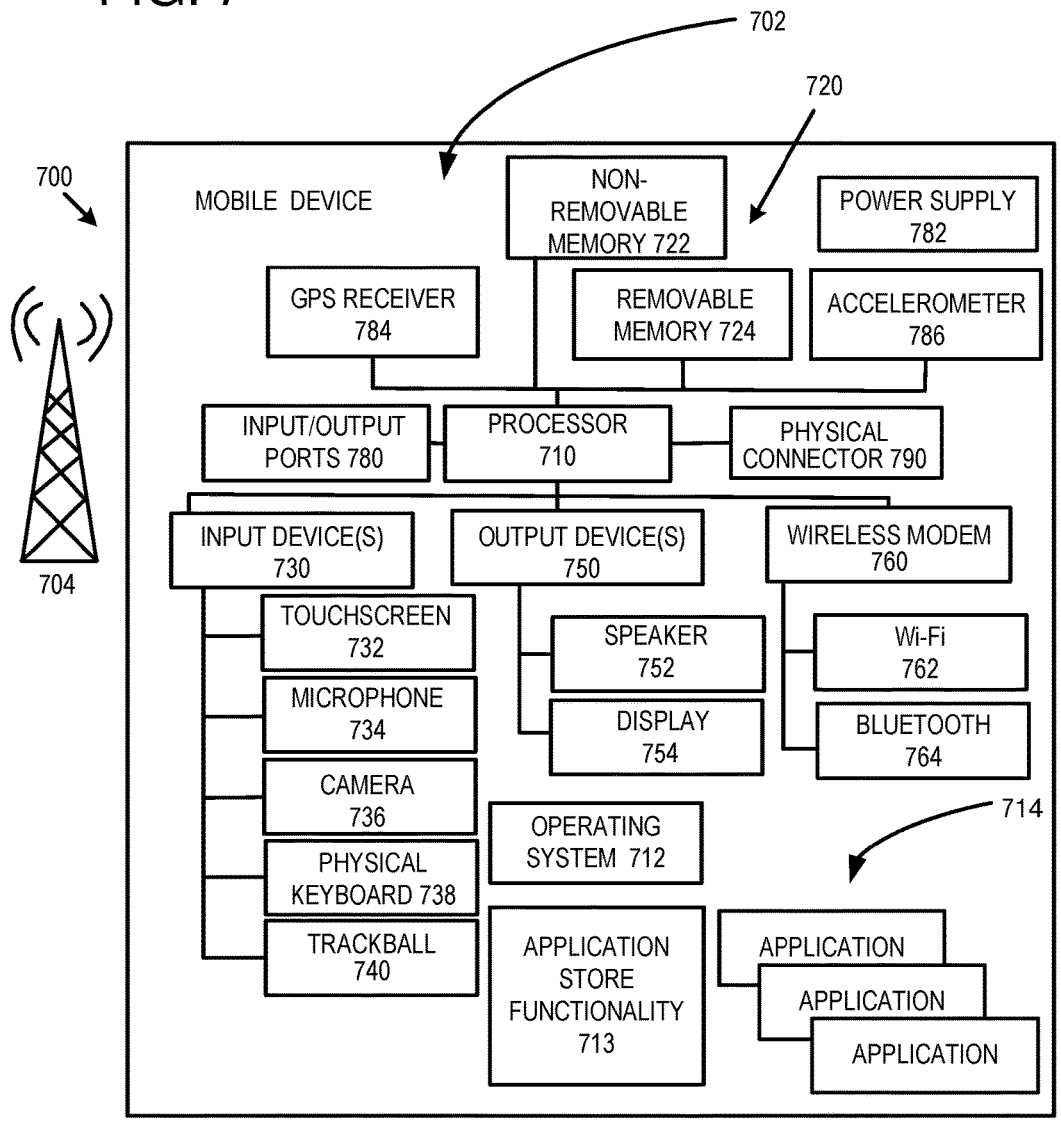
FIG. 7 is an example mobile device that can be used in conjunction with the technologies described herein.

FIG. 7 is a system diagram depicting an example mobile device 700 including a variety of optional hardware and software components, shown generally at 702. Any components 702 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 704, such as a cellular, satellite, or other network.

The illustrated mobile device 700 can include a controller or processor 710 (e.g., signal processor, microprocessor, ASIC, or other control and processing logic circuitry) for performing such tasks as signal coding, data processing, input/output processing, power control, and/or other functions. An operating system 712 can control the allocation and usage of the components 702 and support for one or more application programs 714. The application programs can include common mobile computing applications (e.g., email applications, calendars, contact managers, web browsers, messaging applications), or any other computing application. Functionality 713 for accessing an application store can also be used for acquiring and updating application programs 714.

The illustrated mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running the operating system 712 and the applications 714. Example data can include web pages, text, images, sound files, video data, or other data sets to be sent to and/or received from one or more network servers or other devices via one or more wired or wireless networks. The memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 700 can support one or more input devices 730, such as a touchscreen 732, microphone 734, camera 736, physical keyboard 738 and/or trackball 740 and one or more output devices 750, such as a speaker 752 and a display 754. Other possible output devices (not shown) can include piezoelectric or other haptic output devices. Some devices can serve more than one input/output function. For example, touchscreen 732 and display 754 can be combined in a single input/output device.

The input devices 730 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 712 or applications 714 can comprise speech-recognition software as part of a voice user interface that allows a user to operate the device 700 via voice commands. Further, the device 700 can comprise input devices and software that allows for user interaction via a user's spatial gestures, such as detecting and interpreting gestures to provide input to a gaming application.

A wireless modem 760 can be coupled to an antenna (not shown) and can support two-way communications between the processor 710 and external devices, as is well understood in the art. The modem 760 is shown generically and can include a cellular modem for communicating with the mobile communication network 704 and/or other radio-based modems (e.g., Bluetooth 764 or Wi-Fi 762). The wireless modem 760 is typically configured for communication with one or more cellular networks, such as a GSM network for data and voice communications within a single cellular network, between cellular networks, or between the mobile device and a public switched telephone network (PSTN).

The mobile device can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components 702 are not required or all-inclusive, as any components can be deleted and other components can be added.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 6, computer-readable storage media include memory 620 and 625, and storage 640. By way of example and with reference to FIG. 7, computer-readable storage media include memory and storage 720, 722, and 724. The term computer-readable storage media does not include signals and carrier waves. In addition, the term computer-readable storage media does not include communication connections, such as 670, 760, 762, and 764.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
a processing unit; and
memory;
the processing unit configured to execute computer instructions performing network protocol operations for network communication, the operations comprising:
establishing a network connection between the computing device and a second computing device via a data communication network;
exchanging network packets using a plain text mode with the second computing device over the network connection;
receiving, from the second computing device over the network connection, a network packet, using the plain text mode, requesting a switch of the network connection from the plain text mode to a compressed mode;
sending, to the second computing device over the network connection, a network packet, using the plain text mode, accepting the switch of the network connection to the compressed mode;
after the switch to the compressed mode, exchanging network packets using the compressed mode with the second computing device over the network connection;
detecting that a processing unit load of the first computing device or the second computing device is above a threshold value; and
based at least in part on detecting the processing unit load above the threshold value, sending, between the first computing device and the second computing device over the network connection, a network packet, using the plain text mode, requesting a switch of the network connection to fall back from the compressed mode to the plain text mode;
wherein the network connection remains open during the operations and does not close when switching between the plain text mode and the compressed mode.

2. The computing device of claim 1, wherein network packets communicated over the network connection that use the plain text mode include a data frame header variable with a first value indicating the plain text mode, and wherein network packets communicated over the network connection that use the compressed mode include the data frame header variable with a second value indicating the compressed mode.

3. The computing device of claim 2, wherein the network connection operates over a WebSockets protocol, and wherein the data frame header variable is an opcode variable.

4. The computing device of claim 1, wherein the computing device is part of a live interactive video game streaming service, and wherein the second computing device is a viewer computing device.

5. The computing device of claim 1, wherein the computing device is part of a live interactive video game streaming service, and wherein the second computing device is a broadcaster computing device.

6. The computing device of claim 1, wherein the network packet requesting the switch to the compressed mode comprises an indication of a plurality of available compression algorithms to use for the compressed mode in order of preference, and wherein the network packet accepting the switch to the compressed mode indicates which of the plurality of available compression algorithms will be used for the compressed mode.

7. The computing device of claim 1, wherein the computing device is part of a live interactive video game streaming service, and wherein the second computing device is a broadcaster computing device, the operations further comprising:
receiving, from the broadcaster computing device, a network packet indicating a throttling rule for live interactive control messages received from viewer devices.

8. The computing device of claim 1, wherein the computing device is part of a live interactive video game streaming service, and wherein the second computing device is a broadcaster computing device, the operations further comprising:
receiving, from the broadcaster computing device, a network packet indicating a cooldown time for a live interactive control; and
transmitting the network packet indicating the cooldown time to one or more viewer devices.

9. The computing device of claim 1, wherein the computing device is part of a live interactive video game streaming service, the operations further comprising:
transmitting, to one or more viewer computing devices, a network packet indicating a sampling rate for an analog interactive control.

10. The computing device of claim 1, wherein a fall back from the compressed mode to the plain text mode can be requested, by the computing device or the second computing device, at any time by sending a network packet using the plain text mode.

11. The computing device of claim 1, wherein the network protocol operations support a fall back from the compressed mode to the plain text mode by sending any network packet using the plain text mode, regardless of whether the any network packet sent using the plain text mode requests a switch to fall back.

12. The computing device of claim 1, the operations further comprising:
detecting an error in a received network packet that uses the compressed mode; and
based at least in part on detecting the error, sending, to the second computing device over the network connection, a network packet, using the plain text mode, requesting a switch of the network connection to fall back from the compressed mode to the plain text mode.

13. A method, implemented by a computing device, for performing network protocol operations for network communication, the method comprising:
establishing a network connection between the computing device and a second computing device via a data communication network;
exchanging network packets using a plain text mode with the second computing device over the network connection;
sending, to the second computing device over the network connection, a network packet, using the plain text mode, requesting a switch of the network connection from the plain text mode to a compressed mode;
receiving, from the second computing device over the network connection, a network packet, using the plain text mode, accepting the switch of the network connection to the compressed mode;

after the switch to the compressed mode, exchanging network packets using the compressed mode with the second computing device over the network connection;
detecting that a processing unit load of the first computing device or the second computing device is above a threshold value; and
based at least in part on detecting the processing unit load above the threshold value, sending, between the first computing device and the second computing device over the network connection, a network packet, using the plain text mode, requesting a switch of the network connection to fall back from the compressed mode to the plain text mode;
wherein the network connection remains open during the method and does not close when switching between the plain text mode and the compressed mode.

14. The method of claim 13, wherein network packets communicated over the network connection that use the plain text mode include a data frame header variable with a first value indicating the plain text mode, and wherein network packets communicated over the network connection that use the compressed mode include the data frame header variable with a second value indicating the compressed mode.

15. The method of claim 14, wherein the network connection operates over a WebSockets protocol, and wherein the data frame header variable is an opcode variable.

16. The method of claim 13, wherein the computing device is a viewer computing device communicating over the network connection with the second computing device that is part of a live interactive video game streaming service.

17. The method of claim 13, wherein the network packet requesting the switch to the compressed mode comprises an indication of a plurality of available compression algorithms to use for the compressed mode in order of preference, and wherein the network packet accepting the switch to the compressed mode indicates which of the plurality of available compression algorithms will be used for the compressed mode.

18. A computer-readable storage medium storing computer-executable instructions for causing a computing device to perform network protocol operations for network communication, the operations comprising:
establishing a network connection between the computing device and a second computing device via a data communication network; and
exchanging network packets using a plain text mode with the second computing device over the network connection, wherein network packets communicated over the network connection that use the plain text mode include a data frame header variable with a first value indicating the plain text mode;
receiving, from the second computing device over the network connection, a network packet, using the plain text mode, requesting a switch of the network connection from the plain text mode to a compressed mode;
sending, to the second computing device over the network connection, a network packet, using the plain text mode, accepting the switch of the network connection to the compressed mode;
after the switch to the compressed mode, exchanging network packets using the compressed mode with the second computing device over the network connection, wherein network packets communicated over the network connection that use the compressed mode include the data frame header variable with a second value indicating the compressed mode;
detecting that a processing unit load of the first computing device or the second computing device is above a threshold value; and
based at least in part on detecting the processing unit load above the threshold value, sending, between the first computing device and the second computing device over the network connection, a network packet, using the plain text mode, requesting a switch of the network connection to fall back from the compressed mode to the plain text mode;
wherein the network connection remains open during the operations and does not close when switching between the plain text mode and the compressed mode.

19. The computer-readable storage medium of claim 18, wherein the network packet requesting the switch to the compressed mode comprises an indication of a plurality of available compression algorithms to use for the compressed mode in order of preference, and wherein the network packet accepting the switch to the compressed mode indicates which of the plurality of available compression algorithms will be used for the compressed mode.

20. The computer-readable storage medium of claim 18, the operations further comprising:
detecting an error in a received network packet that uses the compressed mode; and
based at least in part on detecting the error, sending, to the second computing device over the network connection, a network packet, using the plain text mode, requesting a switch of the network connection to fall back from the compressed mode to the plain text mode.

* * * * *